US008478310B2

(12) United States Patent
Reding et al.

(10) Patent No.: US 8,478,310 B2
(45) Date of Patent: Jul. 2, 2013

(54) SHORT MESSAGE SERVICE (SMS) DATA TRANSFER

(75) Inventors: Craig L. Reding, Midland Park, NJ (US); Christopher L. Helbling, Stamford, CT (US); Robert Baruch, Rising Sun, MD (US); Sathish Subramanian, Chennai (IN); Paula A. Dromlewicz, Jefferson, MA (US)

(73) Assignees: Verizon Patent and Licensing Inc., Basking Ridge, NJ (US); Verizon Data Services India Private Limited, Chennai (IN)

( * ) Notice: Subject to any disclaimer, the term of this patent is extended or adjusted under 35 U.S.C. 154(b) by 914 days.

(21) Appl. No.: 11/538,856

(22) Filed: Oct. 5, 2006

(65) Prior Publication Data

US 2008/0085728 A1    Apr. 10, 2008

(51) Int. Cl.
| | |
|---|---|
| H04W 4/00 | (2009.01) |
| H04L 26/06 | (2006.01) |
| H04M 3/42 | (2006.01) |
| H04M 1/725 | (2006.01) |
| H04J 3/16 | (2006.01) |
| G06F 15/16 | (2006.01) |

(52) U.S. Cl.
USPC ............. 455/466; 455/412.1; 455/412.2; 455/414.1; 455/414.3; 370/466; 370/469; 709/230; 709/246

(58) Field of Classification Search
USPC .......................................... 455/466
See application file for complete search history.

(56) References Cited

U.S. PATENT DOCUMENTS

| | | | | |
|---|---|---|---|---|
| 6,389,276 | B1 * | 5/2002 | Brilla et al. ................... | 455/413 |
| 6,487,602 | B1 * | 11/2002 | Thakker ........................ | 709/228 |
| 7,116,975 | B1 * | 10/2006 | Link et al. .................... | 455/417 |
| 7,139,565 | B2 * | 11/2006 | Fiatal et al. ................... | 455/423 |
| 2001/0003202 | A1 * | 6/2001 | Mache et al. ................. | 713/153 |
| 2003/0078058 | A1 * | 4/2003 | Vatanen et al. ............... | 455/466 |
| 2004/0023643 | A1 * | 2/2004 | Vander Veen et al. ........ | 455/413 |
| 2005/0144293 | A1 * | 6/2005 | Limont et al. ................ | 709/228 |
| 2005/0251519 | A1 * | 11/2005 | Davis ........................... | 707/100 |
| 2007/0168869 | A1 * | 7/2007 | Vaidya .......................... | 715/733 |
| 2008/0146257 | A1 * | 6/2008 | Clegg ........................... | 455/466 |

FOREIGN PATENT DOCUMENTS

WO    2004/036912    *    4/2004

OTHER PUBLICATIONS

Schneier, Bruce: Applied Cryptography, 1994 John Wiley and Sons, ISBN 0471597562, pp. 34, 39.

* cited by examiner

*Primary Examiner* — Melody Mehrpour
*Assistant Examiner* — Natasha Cosme

(57) ABSTRACT

Exemplary methods and systems for facilitating SMS data transfer services in mobile devices are described. An exemplary method includes sending a first SMS message to a device with a payload of the first SMS message including machine-readable information. Next, a second SMS message may be received from the device with a payload of the second SMS message including machine-readable information. The first or second SMS message payloads may include, for example, a synchronization message, a call message, call data, or a scheduling message.

30 Claims, 9 Drawing Sheets

SHORT MESSAGE SERVICE (SMS) DATA TRANSFER

BACKGROUND INFORMATION

A wide variety of means exist for communication between users. For example, a user may conduct phone calls via a home phone, work phone, and mobile phone. In addition, users may also communicate using devices such as PCs, PDAs, pagers, etc., using various means of communicating such as voice, email, short text messaging, and instant messaging.

Mobile devices offer a significant convenience to users who travel. However, the user may return home or to work only to find several voicemails and missed calls. Call forwarding features alleviate the problem of missed calls and voicemails, but a user may forget to turn the feature on before leaving. In addition, a user may not always want calls to be forwarded automatically or may want only to review a call log and other call data remotely, without having calls forwarded.

Currently, no services exist for easily and conveniently accessing or synchronizing with call data, including call logs, call forward lists, etc., while carrying on a voice conversation. Blackberry devices offer services that synchronize a remote Blackberry device with business data (e.g., contacts, email) stored on a server. However, no similar services exist for other mobile devices, such as Palm Treo devices, even though such devices are equipped to handle voice communications and data communications using various formats and protocols.

Virtually every mobile device is equipped to send and receive messages formatted according to Short Message Service (SMS) protocols. SMS messages are short messages that may be transmitted and received without interrupting a voice call. However, SMS messages are not secure; they are easily intercepted or observed by anyone having the proper scanning equipment, and can be "spoofed"—made to look as though the message came from another (trusted) party. Moreover, SMS messages are designed to carry payloads of only 160 seven-bit characters. Therefore, SMS messages are popular mainly for transmitting brief non-secure human-readable text messages, but are otherwise underutilized.

DETAILED DESCRIPTION OF PREFERRED EMBODIMENTS

Preferred methods and systems may provide a SMS data transfer service. (As used herein, "SMS" refers to the Short Message Service protocol defined in Global System for Mobile Communications (GSM) recommendation 03.40.) For example, the SMS data transfer service may operate within a typical data processing and telecommunications environment. The SMS data transfer service may send and receive encrypted, authenticated, and compressed SMS messages containing machine-readable commands and data. The SMS messages managed by the SMS data transfer service may be sent or received by any SMS-capable device or user terminal and may include synchronization messages, call messages, call data, and scheduling messages. Such SMS messages may be sent and received contemporaneously with voice communications being conducted using by the SMS-capable device, without the need to disconnect or preclude connection of voice communications. SMS messages thus provide a useful channel for providing call-related messaging.

Reference will now be made in detail to presently preferred exemplary embodiments, examples of which are illustrated in the accompanying drawings. Wherever possible, the same reference numbers will be used throughout the figures to refer to the same or like elements. The accompanying figures illustrate exemplary embodiments and implementations consistent with the present invention, but the description of those embodiments does not indicate or imply that other embodiments or implementations do not fall within the scope of present invention. It is to be understood that other implementations may be utilized and that structural and method changes may be made without departing from the scope of present invention, which is defined by the appended claims.

Figure 1:
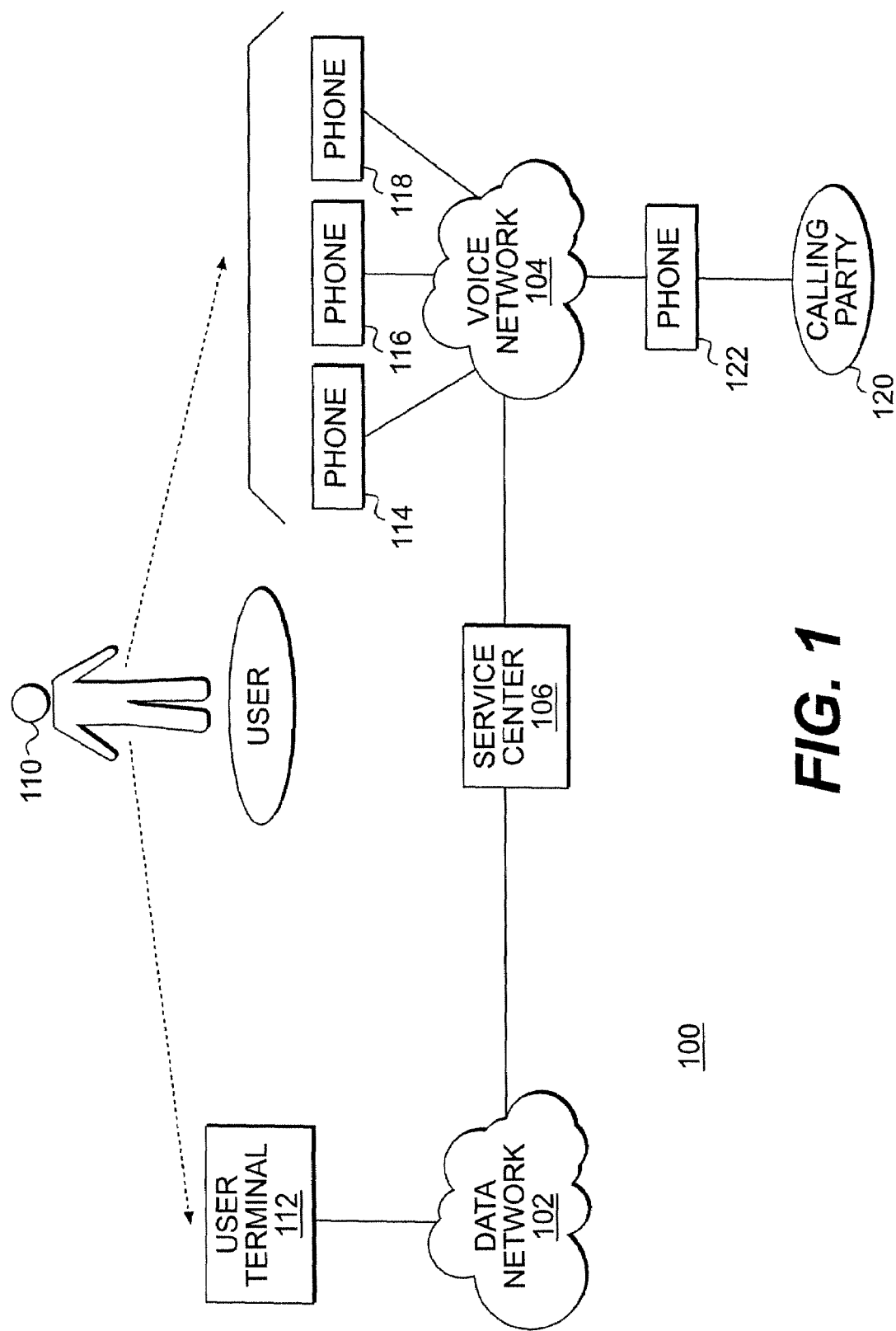
FIG. 1 is a diagram of an exemplary data processing and telecommunications environment.

FIG. 1 is a block diagram of a data processing and telecommunications environment 100, in which features and aspects of the preferred embodiments may be implemented. The number of components in environment 100 is not limited to what is shown and other variations in the number of arrangements of components are possible. The components of FIG. 1 may be implemented through hardware, software, firmware, and/or any combination of these structures. Data processing and telecommunications environment 100 may include a data network 102, a voice network 104, and a service center 106. A user 110 may use a user terminal 112 to interface with data network 102 and may use phones 114, 116, and 118 to interface with voice network 104. A calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. Although FIG. 1 shows a single data network 102, those skilled in the art will appreciate that network 102 is only representative in nature and in some implementations may consist of more than one network configuration designed to communicate using various wireless and wireline structures and various protocols. By way of example, data network 102 may be implemented through a wide area network ("WAN"), local area network ("LAN"), an intranet, and/or the Internet. Further, the service center 106 may be connected to multiple data networks 102, such as, for example, a wireless carrier network and the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented using Voice-over Internet Protocol ("VoIP") technology. In addition, voice network 104 may be implemented using both PSTN and VoIP technology. Further, service center 106 may be connected to multiple voice networks 104, such as, for example, Verizon voice networks, voice networks operated by other carriers, and wireless carrier networks. Although FIG. 1 shows a single voice network 104, those skilled in the art will appreciate that network 104 is only representative in nature and in some implementations may consist of more than one network configuration designed to communicate using various wireless and wireline structures and various protocols.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, firmware, and any combination of these structures. For example, service center 106 may be implemented using one or more general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 with an interface to data network 102. For example, user terminal 112 may be implemented using any device capable of accessing the Internet, such as a general purpose computer or personal computer equipped with a modem. User terminal 112 may also be implemented in other devices, such as the Blackberry™ and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use various protocols in transmitting and receiving messages, including, for example, the Transmission Control Protocol/Internet Protocol (TCP/IP), the hypertext transfer protocol ("HTTP"), the file transfer protocol ("FTP"); the hypertext markup language ("HTML"); the extensible markup language ("XML"); and SMS protocols. Furthermore, a client application may be installed on user terminal 112 to communicate directly with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
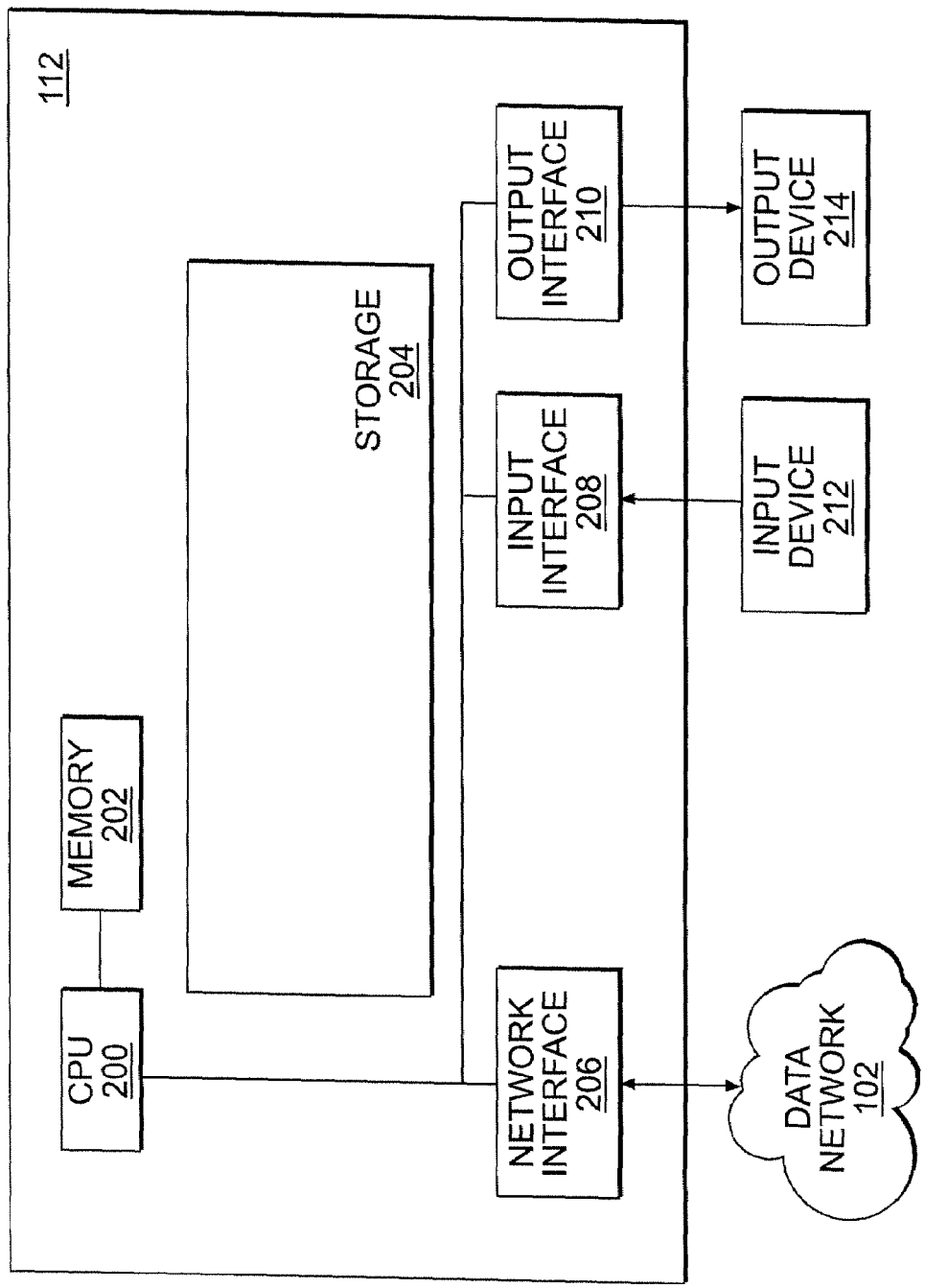
FIG. 2 is a diagram of an exemplary user terminal used in the data processing and telecommunications environment of FIG. 1.

FIG. 2 is a block diagram of a preferred user terminal. User terminal 112 includes a central processing unit ("CPU") 200, a memory 202, a storage module 204, a network interface 206, an input interface 208, an output interface 210, an input device 212, and an output device 214.

CPU 200 provides control and processing functions for user terminal 112. Although FIG. 2 illustrates a single CPU, user terminal 112 may include multiple CPUs. CPU 200 may also include, for example, one or more of the following: a coprocessor, memory, registers, and other processing devices and systems as appropriate. CPU 200 may be implemented, for example, using a Pentium™ processor provided by Intel Corporation.

Memory 202 provides a memory for program code for CPU 200. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, a CD ROM drive, a DVD drive, a general-purpose storage device, a removable storage device, and/or other devices capable of storing information. Further, although storage module 204 is shown within user terminal 112, storage module 204 may be external to user terminal 112 yet connected to user terminal 112 using a variety of wired and wireless architectures such as USB, SCSI, etc.

Storage module 204 may include program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service ("MSNMS") client or America Online Instant Messenger ("AIM") client; and an Operating System ("OS"), such as the Windows Operation System provided by Microsoft Corporation. In addition, storage module 204 may include other program code and information, such as program code for TCP/IP communications; kernel and device drivers; configuration information, such as a Dynamic Host Configuration Protocol ("DHCP") configuration; a web browser, such as Internet Explorer provided by Microsoft Corporation or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem or a LAN port.

Input interface 208 receives input from user 110 via input device 212 and provides the input to CPU 200. Input device 212 may include, for example, a keyboard, a microphone, and a mouse. Other types of input devices may also be implemented. Input interface 208 thus constitutes a point at which a user interacts with user terminal 112.

Output interface 210 provides information to user 110 via output device 214. Output device 214 may include, for example, a display, a printer, and a speaker. Other types of output devices may also be implemented. Output interface 210 similarly constitutes a point at which a user interacts with user terminal 112.

Figure 3:
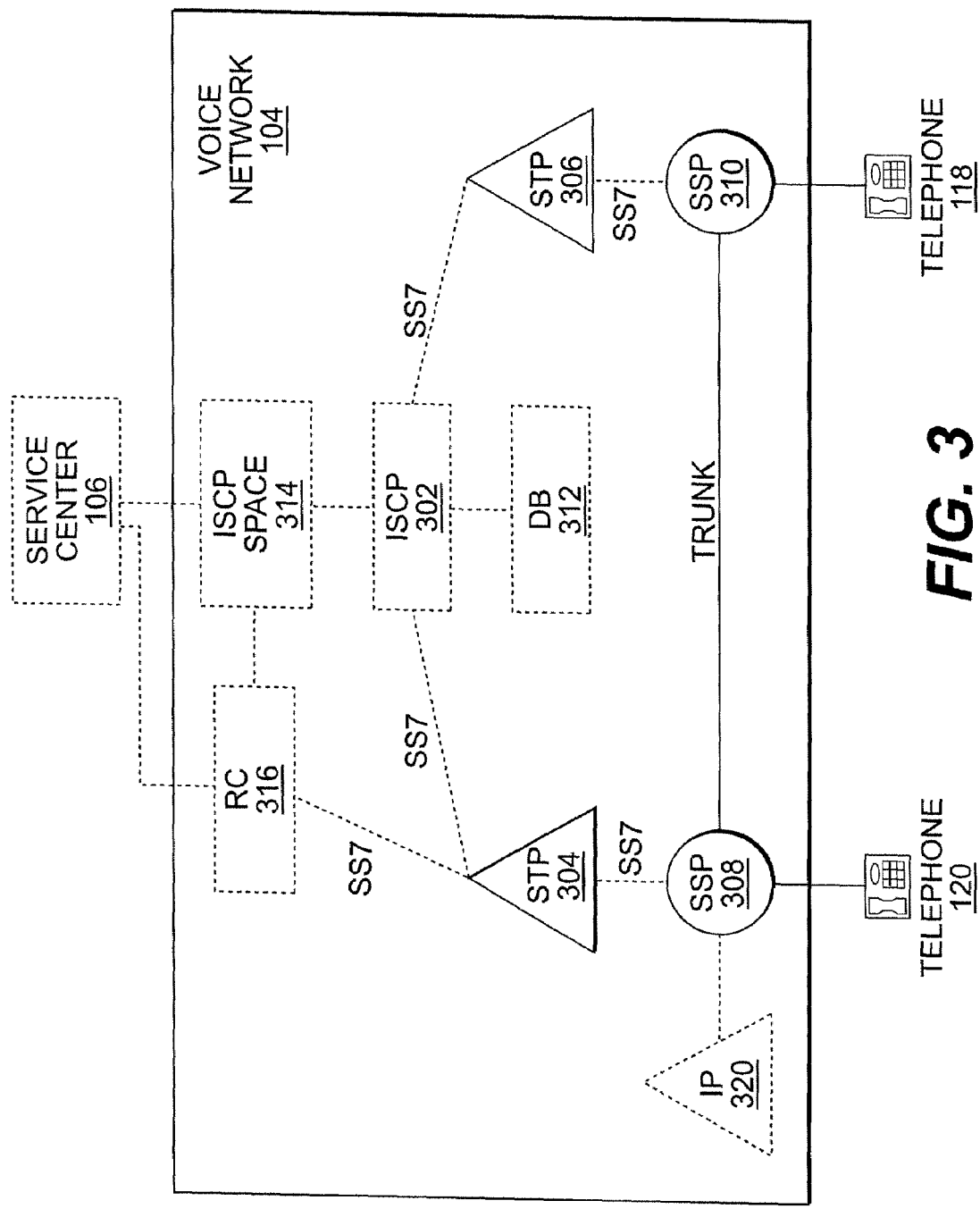
FIG. 3 is a diagram of an exemplary voice network used in the data processing and telecommunications environment of FIG. 1.

FIG. 3 is a diagram of a preferred voice network. As shown, voice network 104 includes an intelligent Service Control Point ("ISCP") 302, service transfer points ("STP") 304 and 306, service switching points ("SSP") 308 and 310, a line information database ("LIDB") 312, an ISCP Service Provisioning and Creation Environment ("SPACE") 314, a Recent Change Engine ("RCE") 316, and an Intelligent Peripheral ("IP") 320.

Voice network 104 may be implemented using the PSTN and SS7 as a signaling protocol. The SS7 protocol allows voice network 104 to provide features, such as call forwarding, caller ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard Service Control Point ("SCP") or an Advanced Intelligent Network ("AIN") SCP. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with a direct connection to service center 106 through ISCP SPACE 314, any number of network elements including routers, switches, hubs, etc., may be used to connect ISCP 302 and service center 106.

STPs 304 and 306 relay SS7 messages within voice network 104. For example, STPs 304 and 306 may route SS7 messages between SSPs 308 and 310. STPs 304 and 306 may be implemented using known hardware and software from manufacturers such as NORTEL™ and LUCENT Technologies™.

SSPs 308 and 310 provide an interface between voice network 104 and phone 114 and phone 122, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 (at phone 122) and user 110 (at phone 114). For example, SSPs 308 and 310 may exchange SS7 messages, such as TCAP messages, within message signal units ("MSU") to control calls, perform database queries to LIDB 312, and provide maintenance information.

LIDB 312 comprises one or more known databases to support the features of voice network 104. For example, LIDB 312 may include subscriber information, such as a service profile, name and address, and credit card validation information.

ISCP SPACE 314 may be included as part of ISCP 302 or be separate from ISCP 302. For example, the Telcordia ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more RCEs 316 such as, for example, an Enterprise Recent Change engine (eRC); an Assignment, Activation, and Inventory System ("AAIS"); or a multi-services platform ("MSP"). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an AAIS is used for providing updates to ISCPs 302.

Additionally, voice network 104 may include one or more IPs. For example, in FIG. 3, an IP 320 is illustrated as being connected to SSP 308. These IPs may be used for providing services, such as voice mail services.

Figure 4:
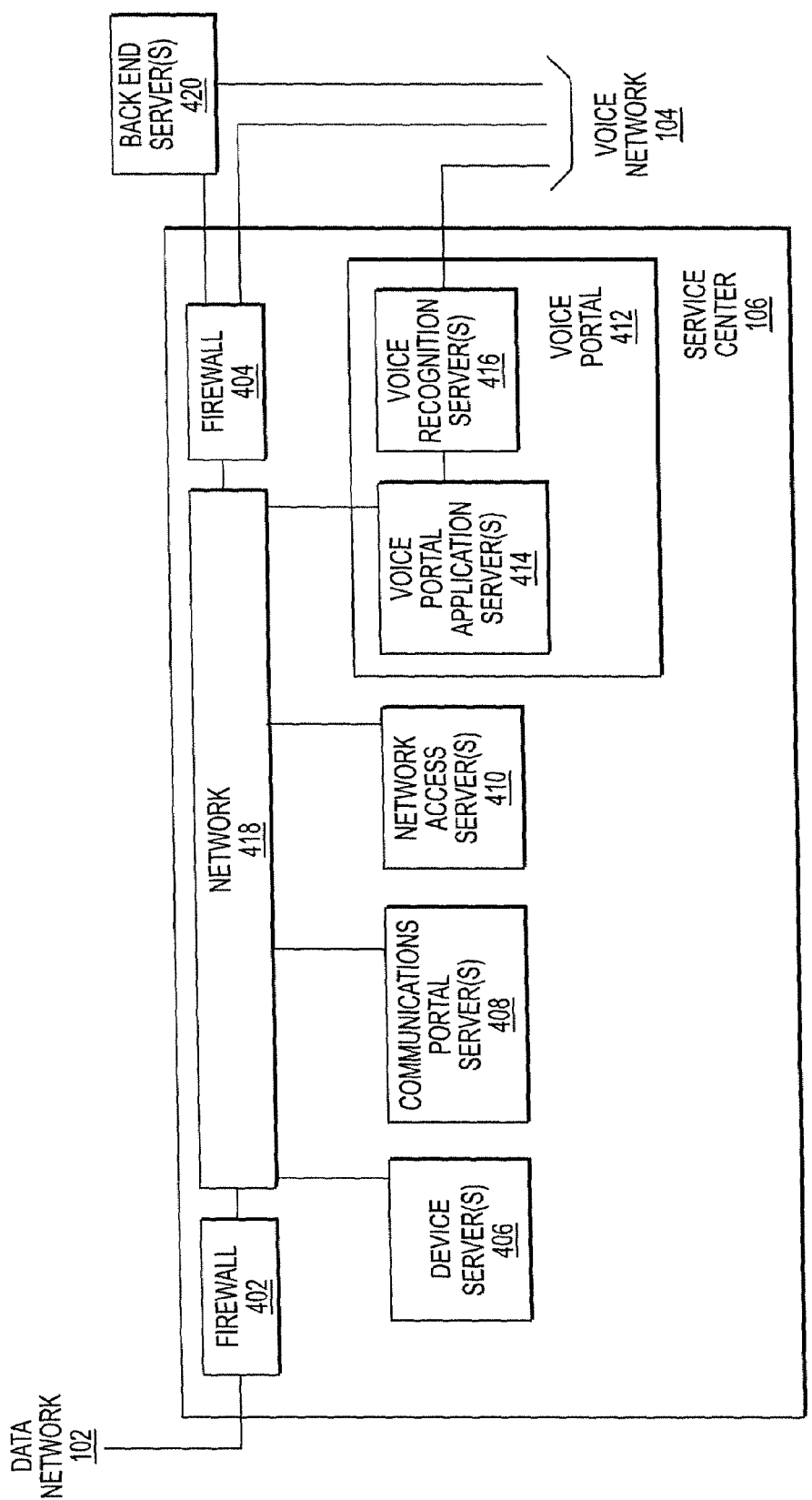
FIG. 4 is a block diagram of an exemplary service center used in the data processing and telecommunications environment of FIG. 1.

FIG. 4 is a block diagram of a preferred service center. As shown, service center 106 may include firewalls 402 and 404, one or more device servers 406, one or more communication portal servers 408, one or more network access servers 410, and a voice portal 412. Voice portal 412 may include a voice portal application server(s) 414 and a voice recognition server (s) 416. A network 418 may be used to interconnect the firewalls and servers. Additionally, back end server(s) 420 may be provided between service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or Fiber Distributed Data Interface ("FDDI") network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, and 420) may be any type of computer, such as a Unix or DOS-based computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a device server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling party's number, setting up conference sessions on-line, etc. Methods and systems of preferred embodiments may leverage device server(s) 406 to perform contact management services.

A communications portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, voice recognition server(s) 416 and voice portal application server(s) 414. Voice recognition server(s) 416 may receive and interpret dictation, or recognize spoken commands. Application server(s) 414 may take, for example, the output from voice recognition server(s) 416, convert it to a format suitable for service center 106, and forward the information to one or more servers (406, 408, and 410) in service center 106.

Figure 5:
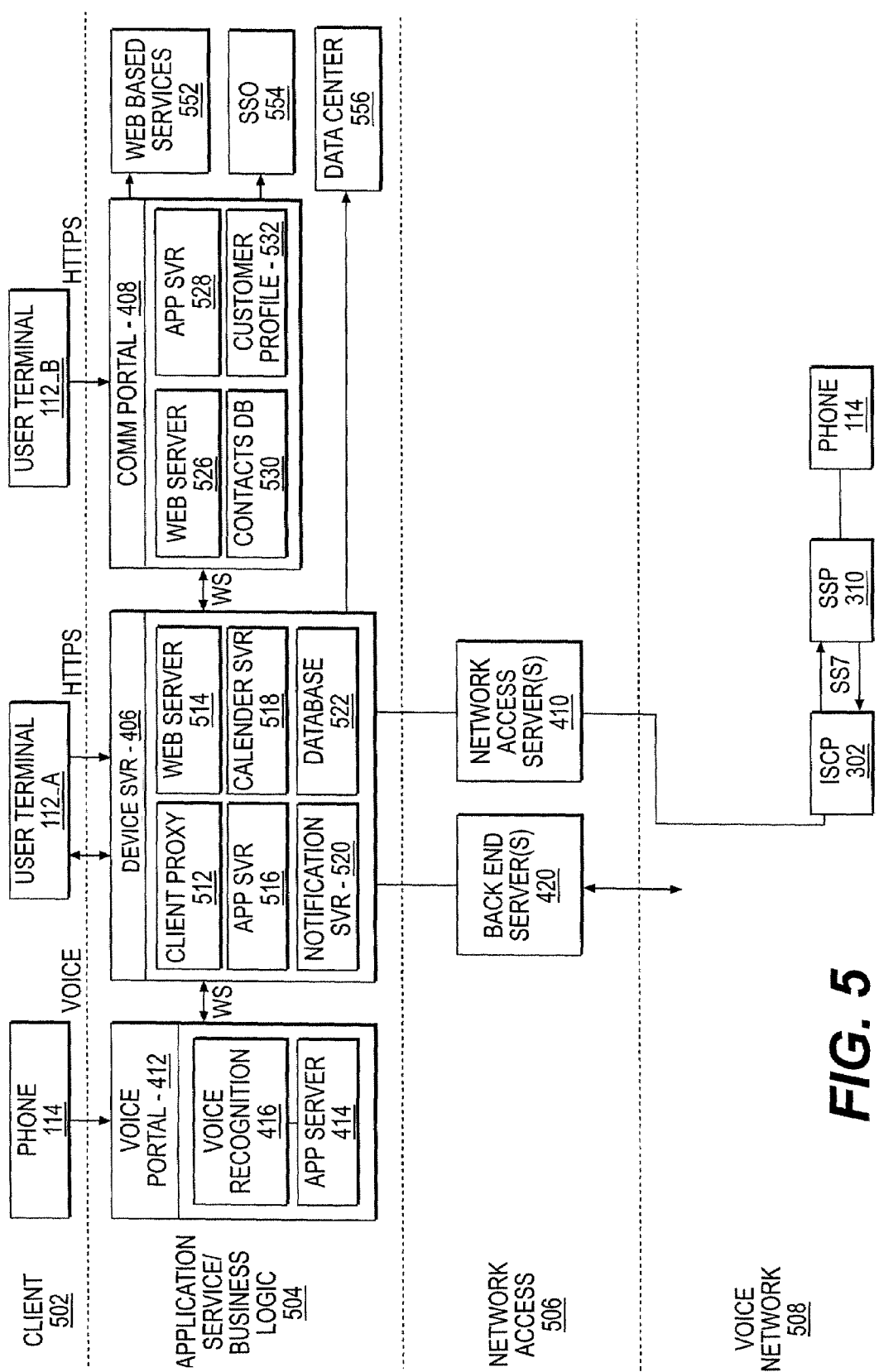
FIG. 5 illustrates a logical architecture of an exemplary data processing and telecommunications system.

FIG. 5 illustrates a logical architecture of a preferred system. As illustrated, the logical architecture may be split into four planes: client side plane 502, application service business logic plane 504, network access plane 506, and voice network plane 508.

Client side plane 502 includes the user terminals 112_A and 112_B that a user may use to send and/or receive information to/from the service center 106. Additionally, client side 502 includes the user's phone(s) 114. As discussed above, user terminals 112 may be any type of device a user may use for communicating with Service Center 106. For example, user terminal 112_A may be a PDA running a program for communicating with Service Center 106, while user terminal 112_B may be a desktop-type computer running a web browser for communicating with Service Center 106 via the Internet. Additionally, the user may have one or more phones 114, such as, for example, one or more standard landline telephones and/or wireless phones.

Application service business logic plane 504 includes device server(s) 406, communication portal server(s) 408, and voice portal 412. These entities may communicate between one another using, for example, web services or any other suitable protocols. Web services are a standardized way of integrating web-based applications using the XML, Simple Object Access Protocol ("SOAP"), Web Services Description Language ("WSDL") and Universal Description, Discovery and Integration ("UDDI") open standards over an Internet Protocol backbone.

As illustrated, a device server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the device server(s) 406 that may be used for security purposes. This client proxy function 512 may be included in a separate server such that all communications sent from the other device server(s) 406 to a user terminal 112 via data network 102 go through client proxy 512. Also, if client proxy 512 is included on a separate server, for example, an additional firewall may be provided between client proxy 512 and other device server(s) 406 to provide additional security.

Web server 514 provides functionality for receiving traffic over data network 102 from a customer. For example, web server 514 may be a standard web server that a customer may access using a web browser program, such as Internet Explorer or Netscape Communicator.

Application server function 516 encompasses the general functions performed by device server(s) 406. For example, these functions may include interfacing with the various other device server functions to perform specific applications provided by the service center. These services may include, for example, interfacing with other function(s), software, and/or hardware to provide a customer with the capability of managing their calls on-line. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties' number, setting up conference sessions on-line, etc. Application server function 516 may facilitate one or more contact management functions.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application functions to perform a function at a particular time, etc.

Notification server function 520 provides the capability to send information from service center 106 to a user terminal 112. For example, notification server function 520 at the direction of application server function 516 may send a notification to user terminal 112 that the user is presently receiving a phone call at user's phone 114.

Database function 522 provides the storage of information usable by the various applications executed by device server(s) 406. These databases may be included in, for example, one or more external storage devices connected to the device server(s) 406. Alternatively, the databases may be included in storage devices within device server(s) 406 themselves. The storage devices providing database function 522 may be any type of storage device, such as, for example, CD-ROMs, DVDs, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of device server(s) 406, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the "superpages.com" website. Application server function 528 could then contact these external services 552 to retrieve information, such as an address for a person in the user's address book.

In another example, application server function 528 of communication portal 408 may interface a single sign on ("SSO") server 554. SSO 554 may be used to allow users to access all services to which the user subscribes, on the basis of a single authentication that is performed when they initially access the network.

Contacts database 530 may include storage devices for storing an address book for the user. This address book may be any type of address book. For example, the user's address book may include the names, phone numbers, and addresses of people and/or organizations. Contacts database 530 may also include group addresses identifying members of a particular group (e.g., "Friends"). The storage devices in contacts database 530 may be internal or external to communication portal servers 408 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Additionally, application services business logic plane 504 of the architecture may include a voice portal 412. As discussed above, voice portal 412 may include, for example, a voice recognition server(s) 416 and an application server(s) 414, and may be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server(s) 414 of voice portal 412 may include hardware and/or software for exchanging information between device servers 406 and voice recognition server(s) 416 or between communication portal servers 408 and voice recognition server(s) 416. Additionally, application server(s) 414 may be included on a separate server, included in the hardware and software providing voice recognition server(s) 416, included in device servers 406, etc.

Network access plane 506 of the architecture includes the functions for providing connectivity between application service business logic plane 502 and voice network 104. For example, this plane may include network access servers 410 and/or back end servers 420.

Network access servers 410 may be included in the service center 106 and may provide the hardware and software for sending and receiving information to voice network 104 in processing the applications provided by the service center. For example, network access servers 410 may include a caller ID ("CID") functionality for retrieving caller ID information from voice network 104, a click to dial ("CTD") functionality for instructing an IP in the voice network to place a call via an SSP, and/or a real-time call management ("RTCM") functionality for interfacing with an ISCP of the voice network.

Network access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to device servers 406.

Additionally, back end server(s) 420 may also include, for example, a directory assistance server. This directory assistance server may, for example, interface service center 106 with a Reverse Directory Assistance Gateway ("RDA Gateway") of voice network 104. An RDA Gateway is a device for issuing requests to a Data Operations Center ("DOC") of voice network 104 for name and/or address information associated with a phone number and receiving the name and/or phone number in response to this request.

In another example, back end server(s) 420 may include a wireless Internet gateway that is used for interfacing with a mobile switching center ("MSC") of a wireless voice network. As with the above-described back end server(s) 420, this wireless Internet gateway may be used for converting requests and information between the formats used by service center 106 and those used by the wireless voice network.

In yet another example, back end server(s) 420 may include a conference blasting server for instructing a conference bridge in voice network 104 to dial out via an SSP to the participants of a voice conference. Or, for example, the back end server(s) may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward through the conference.

In yet another example, back end server(s) 420 may include a Single Number Short Message Service ("SN SMS") server for interfacing the service center 106 with a SMS gateway in voice network 104. This may be used, for example, to permit the customer to have SMS messages addressed to their home phone number directed to an SMS-capable device of the user's choosing.

Voice network plane 508 includes the hardware and software included in voice network 104, as discussed above with reference to FIG. 3. For example, voice network plane 508 may include ISCP 302, IPs 320, and SSP 308. Additionally, voice network plane 508 may also include the hardware and software included in a wireless carrier's network, such as, for example, the mobile switching center, etc.

For clarity of explanation, system 100 is described herein with reference to the discrete functional elements illustrated in FIGS. 1-5. However, it should be understood that the functionality of these elements and modules may overlap and/or may exist in a fewer or greater number of elements and modules. Elements of system 100 may, depending on the implementation, lack certain illustrated components and/or contain, or be coupled to, additional or varying components not shown. Moreover, all or part of the functionality of the elements illustrated in FIGS. 1-5 may coexist or be distributed among several geographically dispersed locations.

Figure 6:
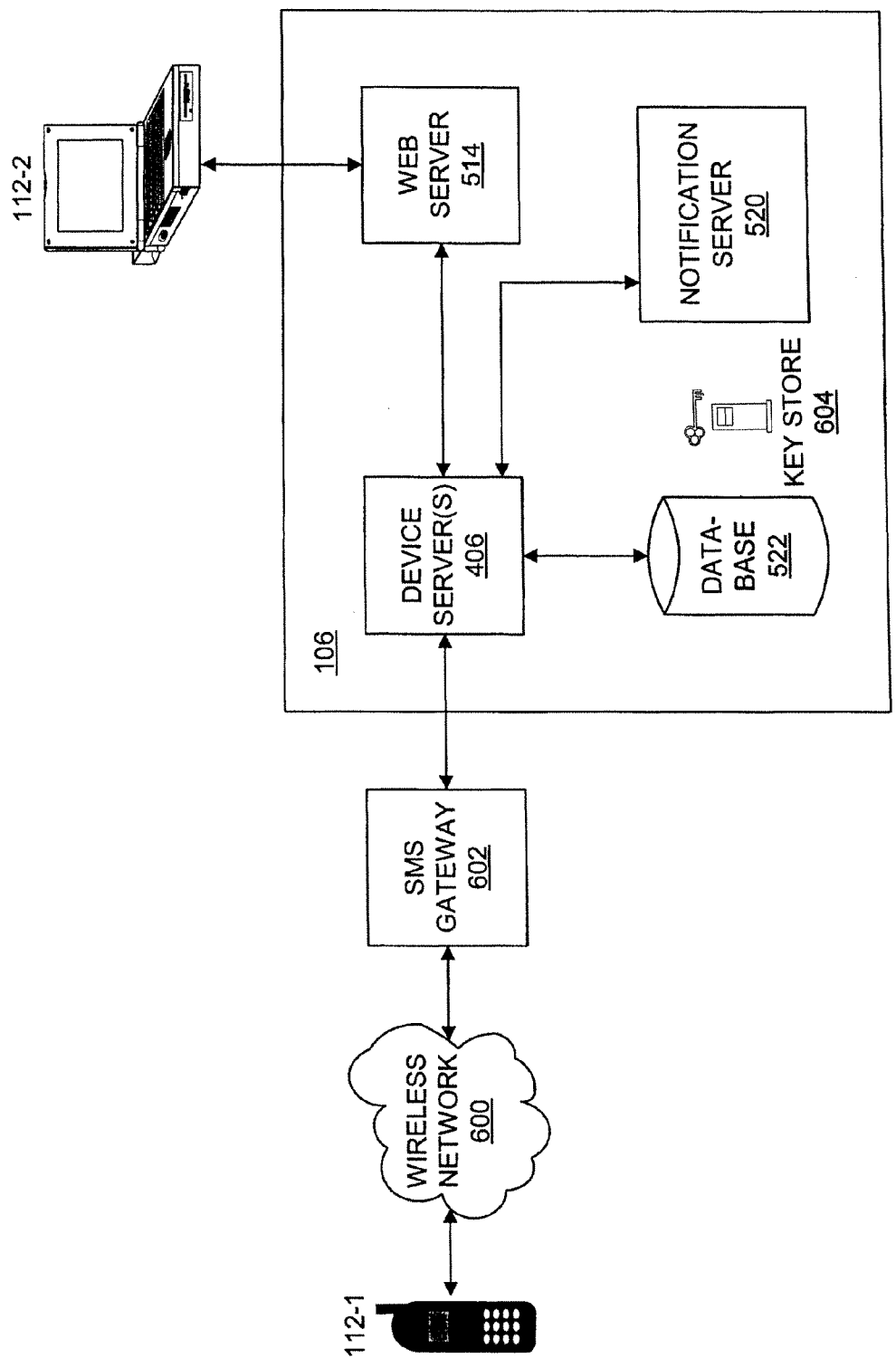
FIG. 6 illustrates an exemplary SMS data transfer architecture.

FIG. 6 diagrammatically illustrates an exemplary SMS data transfer architecture implemented within data processing and telecommunications environment 100. The SMS data transfer architecture may implement an "enhanced" SMS data transfer service, which may include various aspects and features. For example, the enhanced SMS data transfer service may send and receive SMS messages containing machine-readable information, such as encrypted, authenticated, and/or compressed commands and data. The machine-readable information may include commands and functional information. In any event, the machine-readable information may be exclusive of data, text, and other "traditional" SMS messages intended for human reading. Machine-readable information is instead intended for processing using a processor or the like, typically in a format expected by a particular application and/or service.

The enhanced SMS messages managed by the SMS data transfer service may be sent or received by any SMS-capable device, since they take the same format of traditional SMS messages. However, since the payload portion of the SMS message contains machine-readable information, the SMS-capable device may require appropriate facilities to interpret and compose enhanced SMS messages, as will be further describes below. For example, enhanced SMS messages may be distinguished from traditional SMS messages by appending or detecting a predesignated header and/or footer.

Exemplary enhanced SMS messages (in the context of a user terminal that includes mobile phone functionality) may include synchronization messages, call messages, call data, and scheduling messages. A synchronization message may include, for example, instructions to update information stored on the SMS-capable device with information stored on a remote device (e.g., user terminal or server). A call message may include, for example, instructions to access a call record, access a call forward list, forward a call, return a call, play a voice message stored remotely, or send a voice message. A call message may also include notifications, such as, a notification of a new call received at a remote terminal, a new voice message received at a remote terminal, or new contact information. Call data may include, for example a call record, a call forward list, or a voice message. A scheduling message may include, for example, instructions for recording a television broadcast or new calendar information. Other types of enhanced SMS messages may be implemented to achieve various other features/services, as will be apparent.

The exemplary SMS data transfer architecture in FIG. 6 may include an SMS-capable user terminal (or device) 112-1 operably connected to a wireless network 600 to transmit and receive SMS messages over the air. Although SMS-capable device 112-1 is depicted as a phone, it may be any device capable of sending and receiving SMS messages. User terminal 112-1 may further include software that processes the contents of the enhanced SMS messages described above. For example, user terminal 112-1 may include facilities to perform encryption/decryption, compression/decompression, verification of message integrity, and user authentication with respect to SMS messages. Furthermore, user terminal 112-1 may include one or more software applications that may interpret and compose enhanced SMS messages. For example, user terminal 112-1 may include a software application that manages contacts, calendaring and call information, and such application may include facilities to interpret received enhanced SMS messages and compose enhanced SMS messages for transmission, such as those described above.

Wireless network 600 may be operably connected to an SMS gateway (e.g., a Short Message Service Center) 602 to transmit and receive SMS messages using Short Message Peer to Peer (SMPP) protocols. SMS gateway 602 may be integrated with voice network 104 or data network 102 and may be operably connected to device server(s) 406. In the preferred embodiment, communications between device server(s) 406 and SMS gateway may use HTTP. Device server (s) 406 may include facilities to support enhanced SMS messages. For example, device server(s) 406 may include facilities to encrypt and/or compress outgoing SMS messages and to decrypt, decompress, authenticate, verify integrity of, and/or authorize incoming SMS messages. Device server(s) 406 may also include various software applications that use enhanced SMS messaging to perform data transfers with SMS-capable device 112-1.

Database 522 may store information related to the enhanced SMS data transfer service, such as transaction logging and access control information. For example, device server(s) 406 may track delivery and receipt of outgoing SMS messages by storing records corresponding to each SMS message in database 522. For example, a record uniquely identifying an outgoing SMS message may be stored in database 522 with a "to be delivered" status. SMS gateway 602 may send the outgoing SMS message to SMS-capable device 112-1 and may receive a confirmation SMS message (for example, from the device 112-1), confirming successful receipt of the outgoing SMS message. SMS gateway 602 may indicate the successful receipt to device server(s) 406 and device server(s) 406 may update the status of the outgoing SMS message in database 522 to "delivered."

Database 522 may also include or have access to a key store 604. Alternatively, key store 604 may be configured in a variety of ways to provide keys during operation. User key store 604 may store encrypted RSA public/private key pairs used to encrypt/decrypt and authenticate outgoing and incoming SMS messages for each user subscribing to the enhanced SMS data transfer service. Key pairs may be pre-generated in batches or on an individual basis upon subscription of each user. Key pairs may be distributed to users in accordance with secure key distribution methods, such as Advanced Encryption Standard (AES) encrypted email attachments. In addition, the key length of the private and public keys in each key pair may be designed with an expected message length in view. For example a key length of 1120 bits is adequate for encryption of 140 8-bit bytes (corresponding to the standard 160 7-bit character length of SMS messages).

SMS-capable device 112-1 may have enhanced SMS data transfer service capabilities pre-installed and/or a user of SMS-capable device 112-1 may be required to sign up or subscribe to the enhanced SMS data transfer service. For example, the user may log on to a designated web page hosted by web server 514 with any Internet capable user terminal, such as user terminal 112-2. From user terminal 112-2, the user may enter a user ID and/or information identifying SMS-capable device 112-1. Device server(s) 406 may receive a communication from web server 514 with the user ID and a telephone number corresponding to SMS-capable device 112-1. The telephone number may be entered by the logged on user or may be accessed from a database based on user information. Assuming the user is permitted to access the enhanced SMS data transfer service, device server(s) 406 may create a record in database 522, the record including the user ID, the telephone number corresponding to SMS-capable device 112-1, and a "to be provisioned" status. Device server(s) 406 may create a unique key and may send the key in a communication to SMS gateway 602. The subscribing user may receive the unique key in an SMS message from SMS gateway 602 to SMS-capable device 112-1 via wireless network 600. The unique key may then be entered by the user in a designated web page via user terminal 112-2, thus validating the user's ownership of SMS-capable device 112-1.

Upon validation, the user may receive instructions for downloading and installing any software necessary for the enhanced SMS data transfer service to run on SMS-capable device 112-1. The status of SMS-capable device 112-1 in database 522 may then be updated to "provisioned." An SMS message sent from SMS-capable device 112-1 may confirm successful downloading and installation, at which point the status in database 522 may be updated to "ready." Once the enhanced SMS data transfer service is provisioned and ready, SMS-capable device 112-1 may begin sending and receiving enhanced SMS messages, such as the synchronization messages, call messages, call data, and scheduling messages noted above.

A synchronization message may include synchronization requests and synchronization responses. A synchronization request may include instructions to update information stored on SMS-capable device 112-1 with information stored on a remote terminal. The remote terminal could be another user terminal (such as user terminal 112-2) or a terminal (e.g., a database) within service center 106. Synchronization messages may be sent and received automatically according to a predetermined frequency (e.g., once a day) or manually based on user input. For example, SMS-capable device 112-1 may send an enhanced SMS message containing a request that device server(s) 406 may recognize as a synchronization request. Device server(s) 406 and/or notification server 520 may request or fetch synchronization information from various other locations, such as user terminal 112-2 or servers/databases within service center 106. The synchronization information may include, for example, new contact information, new schedule information, call details (e.g., information about calls received or missed at a remote telephone), voicemail details, and a call-forward list. The synchronization information gathered by device server(s) 406 and/or notification server 520 may be formatted as one or more enhanced SMS messages, which may be transmitted to SMS-capable device 112-1 in a synchronization response to the synchronization request.

An exemplary synchronization response may include the synchronization information described above in the following format:

<user ID> : <status record> <status record> . . . <status record>

The "<user ID>" field may indicate a user's unique user ID, and the "<status record>" fields may include status information. Each "<status record>" field may be formatted, for example, as follows:

<Telephone Number> TAB <status1> <status2> <New calls> <Voice mails>

The "<Telephone Number>" field may indicate a telephone associated with the user (e.g., one of phones 114,116 or 118). The "<status1>" field may indicate whether call forwarding is enabled on the telephone. The "<status2>" field may indicate whether voice mail is enabled on the telephone. The "<New calls>" field may indicate a number of new calls received at the telephone. The "<Voice mails>" field may indicate a number of voice mail messages received at the telephone. Various other fields may also be included to transmit, for example, new contact information, new schedule information, and a call-forward list. In addition, multiple <status record> fields may be included in a synchronization response, depending on a number of telephones associated with the user. If the response to the synchronization message requires more than 160 7-bit characters, which is the standard length of a single SMS message, the response may be broken into multiple SMS messages that are sequenced according to known SMS message sequencing methods.

A predetermined encoding scheme may be used to limit a number of characters used in each field described above, thereby minimizing message length. For example, a highest expected number of new calls may be 10,000. Thus, the "<New calls>" field may be fixed to a four digit string, for example. Other fields may be similarly fixed in length. Moreover, fields containing strings of digits (e.g., "<Telephone Number>," "<New calls>," "<Voice mails>") may be compressed (i.e., encoded) according to a base-100 encoding scheme, meaning each 7-bit character in the SMS message may correspond to a number between 0 and 99 inclusive. Thus, a 10 digit telephone (e.g., 8005551212) may be represented with five 7-bit characters (e.g., 80, 05, 55, 12, 12).

A call message may include instructions to access call data, forward a call, return a call, play a voice message stored remotely, or send a voice message. Call data may include a call record (e.g., a call log), a call forward list, or a voice message. A call record may be a record of calls received, missed, and placed at a remote telephone. For example, a user may be away from home or from an office and may wish to check a call record on the home or office telephone. Using SMS-capable device 112-1, the user may send an instruction via one or more enhanced SMS messages to retrieve the call record. Device server(s) 406 may have access to the call record and may send the call record details as one or more enhanced SMS messages to SMS-capable device 112-1. SMS-capable device 112-1 may process the enhanced SMS messages sent from device server(s) 406 to display the call record to the requesting user. The user may then review the call record and may select a telephone number in the call record to call back. In addition, a call message may include instructions to delete a call record stored remotely from SMS-capable device 112-1.

A similar process may take place when a user wishes to access a call forward list associated with a remote telephone. For example, based on user input and commands SMS-capable device 112-1 may send a call message in the form of one or more enhanced SMS messages including an instruction to retrieve a call forward list from device server(s) 406. A call forward list may be a list of forwarding telephone numbers organized by priority, schedule, or both. In addition, a call message may include instructions to turn a call forwarding feature on/off at a remote telephone. A call message may also include instructions to delete, add, and/or modify a call forward list stored remotely from SMS-capable device 112-1.

Based on user input and commands, SMS-capable device 112-1 may also send a call message in the form of one or more enhanced SMS messages including an instruction to retrieve a voice message stored remotely. The voice message may be sent to SMS-capable device 112-1 in the form of one or more enhanced SMS messages. Once retrieved, the voice message may be played by SMS-capable device 112-1. Conversely, SMS-capable device 112-1 may send a call message containing a voice message in the form of one or more enhanced SMS messages.

A call message may also include notifications from notification server 520 transmitted in the form of one or more enhanced SMS messages. For example, notification server 520 may detect or may receive an indication of a new call log entry, a new email, or when a new voice message is received at a remote device (e.g., a telephone associated with the user, such as phones 114, 116 or 118). Notification server 520 may also detect or may receive an indication of a call log entry status (e.g., reviewed or deleted), a voice message status (e.g., played or deleted) or a call forwarding status (e.g., on or off) associated with a remote device or telephone. Notification server 520 may send an appropriate notification to SMS-capable device 112-1 in the form of one or more enhanced SMS messages. SMS-capable device 112-1 may process the enhanced SMS messages sent from device server(s) 406 to display an appropriate notification to a user. Notification server or device server(s) 406 may also detect or receive an indication of contact information being added or modified in contacts database 530 and may notify a user of SMS-capable device 112-1 accordingly in the form of one or more enhanced SMS messages.

Occasionally notifications may be sent when SMS-capable device 112-1 is turned off or out of range. Unacknowledged notifications may be queued by wireless network 600 and retransmitted periodically for a set period of time (e.g., five days) before expiring. If SMS-capable device 112-1 is turned on or brought in range again after the five day period, SMS-capable device 112-1 may send a synchronization request, based on user input, to device server(s) 406. Any information lost as a result of missing notifications may then be restored in SMS-capable device 112-1 by receipt of synchronization information from device server(s) 406.

A scheduling message may be one or more enhanced SMS messages including instructions to, for example, record a television broadcast or new calendar information. For example, based on user input and commands SMS-capable device 112-1 may transmit a message to device server(s) 406 containing instructions for recording a television broadcast. Device server(s) 406 may interpret the instructions and may program a digital video recorder to record the requested broadcast in accordance with the instructions. Alternatively, device server(s) 406 may forward the instructions to an appropriate server capable of programming the digital video recorder. The digital video recorder may be centrally located or located at the premises of the requesting user. A scheduling message may also include an instruction to add, modify, or delete an entry in a remotely stored calendar application.

In addition to providing the communications services described above, applications associated with other services such as email services and financial transaction services may be hosted on service center 106. These applications may be provided by one or more vendors unaffiliated with a vendor of telephone services and may request or fetch various types of information from various locations for transmission to SMS-capable device 112-1. The information requested or fetched may be any machine-readable information including synchronization information, call messages, call data, and scheduling messages, as described above. Moreover, synchronization information and/or call data may include email notifications, including a number of new emails and/or contact information associated with new emails. In addition, call data may include financial account balance statements and call messages may include instructions for performing financial transactions, including deposits, withdrawals, and/or transfers from financial accounts.

The SMS messages described above may be transmitted and received using SMS messaging channels. As such, they may take advantage of the ability to send and receive SMS messages while conducting (and without interrupting) voice communications over wireless voice communications channels. For example, the call messages described above may be utilized to provide "real-time" call management capabilities (e.g., forwarding to alternate numbers, voice mail, etc.). Likewise, notifications for service transactions supported using the system may be conveyed real-time, without disconnecting (or delaying activation of) call sessions.

Figure 7:
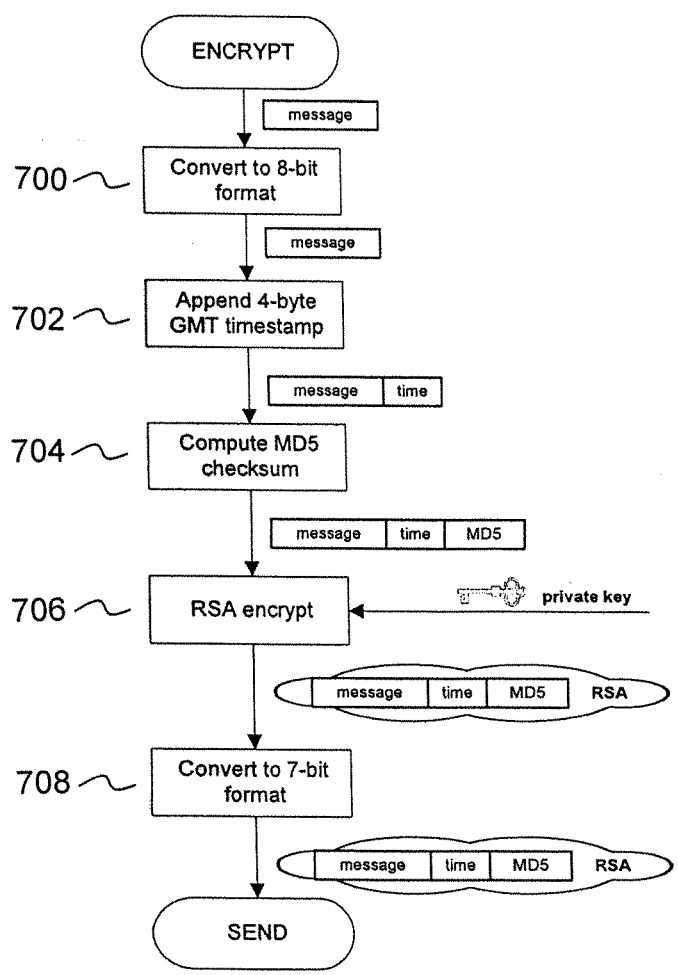
FIG. 7 is an exemplary encryption method applied to SMS messages.

FIG. 7 depicts an exemplary encryption method used to encrypt and sign (i.e., authenticate) SMS messages, including enhanced and/or traditional SMS messages. Traditional SMS messages typically have a 7-bit format. That is, each character or byte is 7 bits long. However, many software applications, including the RSA encryption algorithm, are compatible only with 8-bit data. Therefore, upon receiving or generating an outgoing 7-bit SMS message, device server(s) 406 may convert SMS message 700 to an 8-bit format (stage 700) resulting in an 8-bit formatted SMS message. As a security measure against replay attacks, device server(s) 406 may then append a 4-byte timestamp to the 8-bit formatted SMS message (stage 702). (See, for example, Schneier, Bruce, *Applied Cryptography*, John Wiley and Sons, 1994, ISBN 0471597562, p. 39.) For additional security and verification of message integrity, device server(s) 406 may also append a Message-Digest algorithm 5 (MD5) checksum to the 8-bit converted SMS message (stage 704). Device server(s) 406 may then encrypt the 8-bit formatted SMS message using an appropriate private key obtained from user key store 604 (stage 706). For example, device server(s) 406 may send a request to database 522, which accesses user key store 604, for the private key corresponding to a unique user ID or telephone number associated with the outgoing SMS message. In preparation for transmission through SMS gateway 602, device server(s) 406 may convert the encrypted SMS message back to a 7-bit format (stage 708).

Although the encryption method in FIG. 7 has been described with reference to device server(s) 406 performing encryption on outgoing messages, SMS-capable device 112-1 may also perform encryption in a substantially similar manner. Instead of accessing a private key from user key store 604, however, SMS-capable device 112-1 may access a private key stored in a secure area of local memory.

After or before encrypting a message for transmission, device server(s) 406 may sequence multiple enhanced SMS messages together. For example, if an enhanced SMS message exceeds the 160 7-bit character limit, the enhanced SMS message may be broken into multiple enhanced SMS messages, each containing a sequencing header according to known sequencing methods for traditional SMS messages.

Figure 8A:
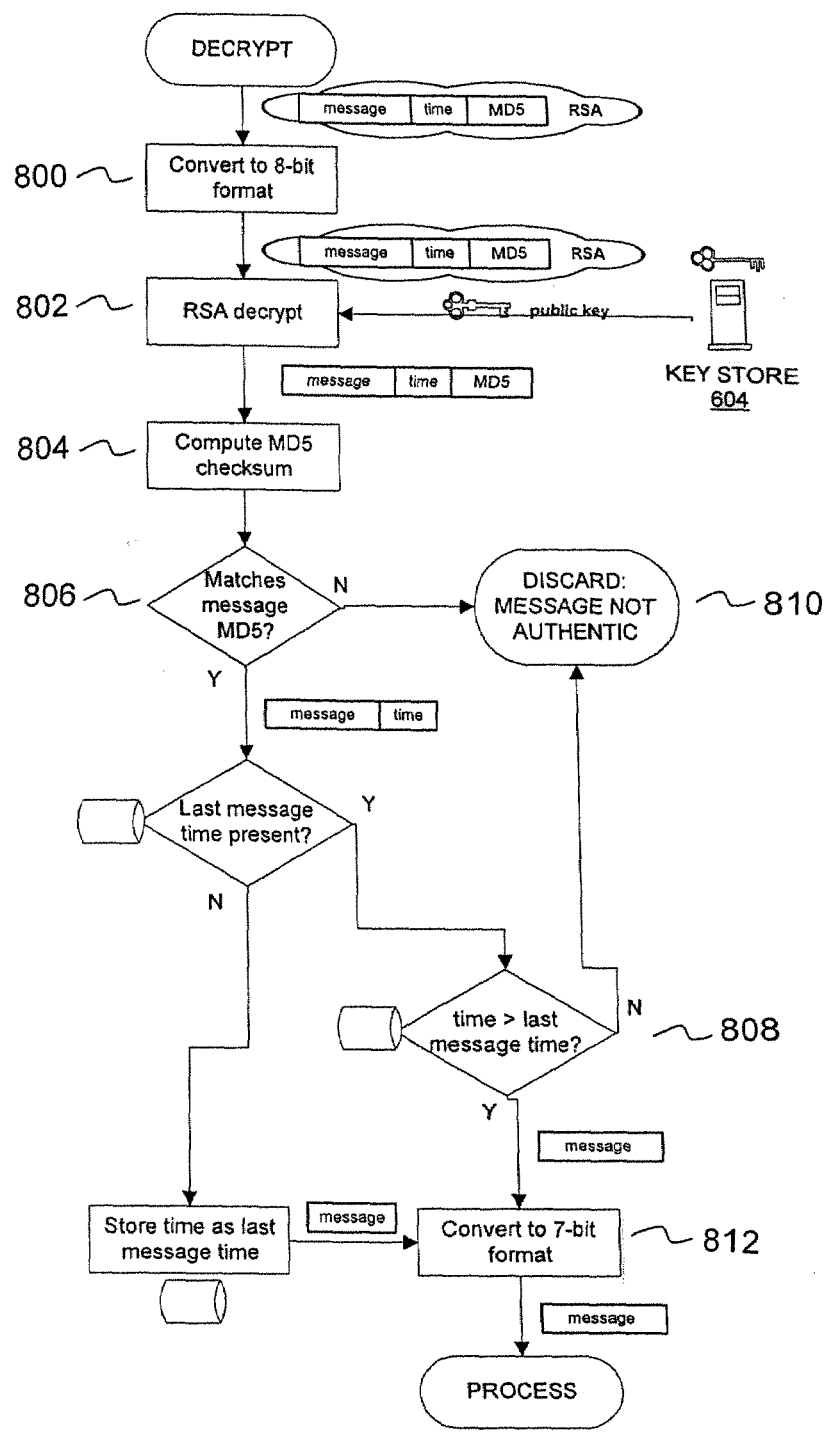
FIGS. 8A and 8B are exemplary decryption methods applied to encrypted SMS messages.

FIG. 8A depicts an exemplary first decryption method for decrypting and authenticating an SMS message sent from SMS-capable device 112-1 and received at device server(s) 406. First, a received SMS message (enhanced or traditional) is converted to an 8-bit format (stage 800), decrypted using the appropriate public key from user key store 604 (stage 802), and the MD5 checksum is computed (stage 804). If the computed MD5 checksum matches the MD5 checksum in the message (stage 806) then the 4-byte timestamp is checked to defend against a replay attack (stage 808). If either the MD5 checksum in the message does not match the computed MD5 checksum or the 4-byte timestamp is not greater than a last message time, then the received SMS message is discarded as not authentic (stage 810). If, however, the SMS message passes both the MD5 and the timestamp authentication (stages 806 and 808), the decrypted SMS message is converted to 7-bit format (stage 812) and is then appropriately processed by device server(s) 406.

Figure 8B:
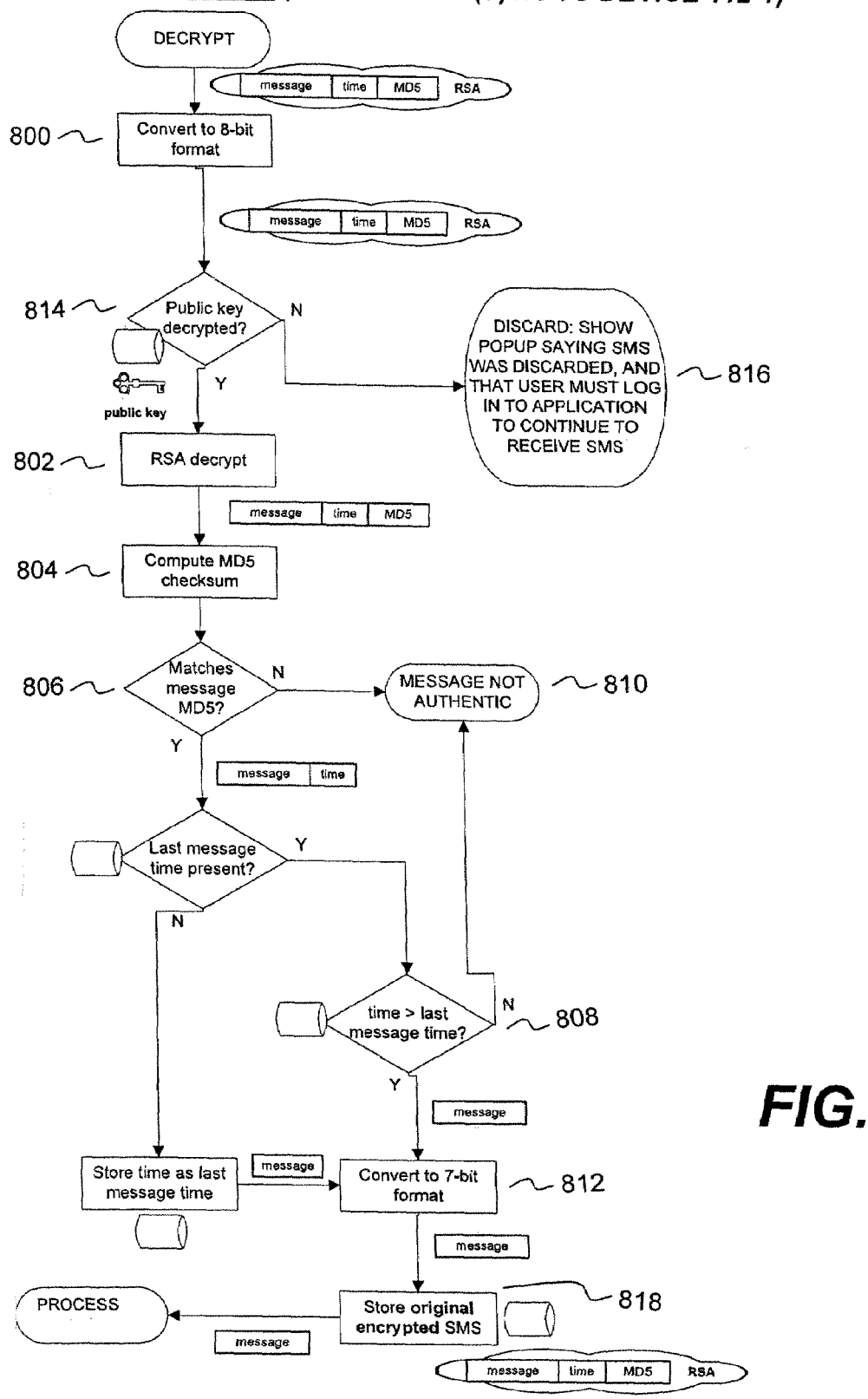

FIG. 8B depicts an exemplary second decryption method for decrypting and authenticating an SMS message sent from device server(s) 406 and received at SMS-capable device 112-1. The decryption method in FIG. 8B includes stages corresponding to stages 800-812 in FIG. 8A. However, the decryption method in FIG. 8B differs in that SMS-capable device 112-1 checks for a decrypted public key in its local memory (stage 814) before decrypting the SMS message (stage 802). The decrypted public key may not be found if, for example, a predetermined period of inactivity has occurred. If the decrypted public key is not found, a message may be displayed on SMS-capable device 112-1 advising a user to log in (stage 816). Requiring a log in after a period of inactivity may serve to reduce a risk of SMS messages being decrypted and read by unknown third parties. In addition, the decryption method in FIG. 8B may include storing the original encrypted SMS message (stage 818) in local memory after converting the decrypted SMS message to 7-bit format (stage 812). Thus, if a user is not logged in at a time of SMS message decryption or wishes to access the SMS message again later, the original encrypted SMS message may be accessed and decrypted again for appropriate processing.

The system configuration described above and depicted in FIG. 6 may be modified in numerous ways, as will be apparent. For example, although device server(s) 406, database 522, notification server 520 and web server 514 are shown as separate entities, any of these may be combined into one or more physical servers, including in a distributed architecture. In addition, device server(s) 406, database 522, notification server 520 and web server 514 may be considered within service center 106, or may be deployed outside of service center 106. Additional components may be deployed within service center 106 (e.g., servers, routers, databases, etc.) which may act as intermediaries or provide additional facilities to the illustrated components.

The stages illustrated in FIGS. 7, 8A, and 8B are consistent with exemplary implementations of the invention. It should be understood that the sequence of events described in FIGS. 7, 8A, and 8B are exemplary and not intended to be limiting. Thus, other method stages may be used, and even with the methods depicted in FIGS. 7, 8A, and 8B, the particular order of events may vary without departing from the scope of the present invention. Moreover, certain stages may not be present and additional stages may be implemented in the methods illustrated in FIGS. 7, 8A, and 8B.

In the preceding specification, various preferred exemplary embodiments have been described. It will, however, be evident that various modifications and changes may be made thereunto without departing from the broader spirit and scope of the invention as set forth in the claims that follow. Embodiments consistent with the claimed invention may be implemented in various environments, and the processes described herein are not inherently related to any particular apparatus and may be implemented by any suitable combination of components. Moreover, various types of general purpose devices may be used in accordance with the teachings described herein, and different combinations of hardware, software, and firmware may be suitable for practicing embodiments of the present invention. The exemplary systems and methods described in this specification (including the drawings) are accordingly to be regarded in an illustrative rather than restrictive sense.

What is claimed is:

1. A computer-implemented method comprising the steps implemented by one or more computers of:
   receiving a first enhanced Short Message Service ("SMS") message from a device, the first enhanced SMS message being formatted according to an enhanced Short Message Service ("SMS") format, the first enhanced SMS message including machine-readable information and a human-readable text message, the first enhanced SMS message being one of enhanced SMS message types including synchronization message type, call message type, call data type, or scheduling message type, each of the enhanced SMS message types representing a different type of request;
   determining the enhanced SMS message type of the first SMS message based on the machine-readable information of the first SMS message;
   processing the first enhanced SMS message based on the determined enhanced SMS message type; and
   sending a second enhanced Short Message Service ("SMS") message to the device, the second enhanced SMS message having a payload including at least some data associated with the processed first enhanced SMS message and being initiated upon receiving the first enhanced SMS message from the device,
   wherein the machine-readable information of the first enhanced SMS message identifies the first enhanced SMS message as being in the enhanced SMS format.

2. The method of claim 1, wherein the call message type represents a request to perform at least one of access a call record, access a call forward list, forward a call, play a voice message stored remotely, or send a voice message.

3. The method of claim 1, wherein the call data type represents a request for at least one of:
   a call record, a call forward list, or a voice message.

4. The method of claim 1, wherein the synchronization message type represents a request to update information stored on the device with information stored remotely.

5. The method of claim 1, wherein the scheduling message type represents a request to record a television broadcast or new calendar information.

6. The method of claim 1, wherein the first enhanced SMS message is the call message type, and includes a notification of at least one of:

a new call received at a remote terminal, a new voice message received at a remote terminal, or new contact information.

7. The method of claim 1, further comprising encrypting and compressing the first enhanced SMS message.

8. The method of claim 7, wherein the encrypting is performed with a private key from a key pair and the compressing is performed with a base-100 encoding scheme.

9. The method of claim 1, further comprising at least one of:
authenticating and verifying integrity of the second enhanced SMS message.

10. The method of claim 9, wherein the verifying integrity includes computing a checksum and the authenticating includes decrypting the second enhanced SMS message with a public key from a key pair.

11. The computer-implemented method of claim 1, wherein the machine-readable information of the first enhanced SMS message is included in a predetermined location of the first enhanced SMS message.

12. The computer-implemented method of claim 11, wherein the predetermined location is a header or footer of the first enhanced SMS message.

13. A device comprising:
a transceiver configured to:
send a first enhanced Short Message Service ("SMS") message, the first enhanced SMS message being formatted according to an enhanced Short Message Service ("SMS") format, the first enhanced SMS message including machine-readable information and a human-readable text message, the first enhanced SMS message being one of enhanced SMS message types including synchronization message type, call message type, call data type, or scheduling message type, each of the enhanced SMS message types representing a different type of request; and
receive a second enhanced Short Message Service ("SMS") message, the second enhanced SMS message having a payload including at least some data from processing of the first enhanced SMS message and being sent upon receipt of the first SMS message sent by the device, the data included in the payload of the second enhanced SMS message being based at least on the enhanced SMS message type of the first enhanced SMS message,
wherein the machine-readable information of the first enhanced SMS message identifies the first enhanced SMS message as being in the enhanced SMS format.

14. The device of claim 13, wherein the call message type represents a request to perform at least one of access a call record, access a call forward list, forward a call, play a voice message stored remotely, or send a voice message.

15. The device of claim 13, wherein the synchronization message type represents a request to update information stored on the device with information stored remotely.

16. The device of claim 13, wherein the scheduling message type represents a request to record a television broadcast or new calendar information.

17. The device of claim 13, wherein at least one of the first enhanced SMS message or the second enhanced SMS message is encrypted or compressed.

18. The device of claim 13, wherein the machine-readable information of the first enhanced SMS message is included in a predetermined location of the first enhanced SMS message.

19. The device of claim 18, wherein the predetermined location is a header or footer of the first enhanced SMS message.

20. A server comprising:
a transceiver configured to:
receive a first enhanced Short Message Service ("SMS") message from a device, the first enhanced SMS message being formatted according to an enhanced Short Message Service ("SMS") format, the first enhanced SMS message including machine-readable information and a human-readable text message, the first enhanced SMS message being one of enhanced SMS message types including synchronization message type, call message type, call data type, or scheduling message type, each of the enhanced SMS message types representing a different type of request;
logic operable to:
determine the enhanced SMS message type of the first SMS message based on the machine-readable information of the first SMS message; and
process the first enhanced SMS message based on the determined enhanced SMS message type; and
the transceiver being further configured to send a second enhanced Short Message Service ("SMS") message to the device, the second enhanced SMS message having a payload including at least some data associated with the processed first enhanced SMS message and being sent upon receiving the first enhanced SMS message from the device,
wherein the machine-readable information of the first enhanced SMS message identifies the first enhanced SMS message as being in the enhanced SMS format.

21. The server of claim 20, wherein the call data type represents a request for at least one of:
a call record, a call forward list, or a voice message.

22. The server of claim 20, wherein the first enhanced SMS message is the call message type, and includes a notification of at least one of:
a new call received at a remote terminal, a new voice message received at a remote terminal, or new contact information.

23. The server of claim 20, wherein at least one of the first enhanced SMS message or the second enhanced SMS message is compressed or encrypted with a private key from a key pair.

24. The server of claim 20, wherein the machine-readable information of the first enhanced SMS message is included in a predetermined location of the first enhanced SMS message.

25. The server of claim 24, wherein the predetermined location is a header or footer of the first enhanced SMS message.

26. A non-transitory computer-readable medium comprising instructions to cause a device to perform a method comprising:
sending a first enhanced Short Message Service ("SMS") message, the first enhanced SMS message being formatted according to an enhanced Short Message Service ("SMS") format, the first enhanced SMS message including machine-readable information and a human-readable text message, the first enhanced SMS message being one of enhanced SMS message types including synchronization message type, call message type, call data type, or scheduling message type, each of the enhanced SMS message types representing a different type of request; and
receiving a second Short Message Service ("SMS") message, the second enhanced SMS message having a payload including at least some data from processing of the first enhanced SMS message and being sent upon receipt of the first SMS message sent by the device, the data included in the payload of the second enhanced SMS message being based at least on the enhanced SMS message type of the first enhanced SMS message, wherein the machine-readable information of the first enhanced SMS message identifies the first enhanced SMS message as being in the enhanced SMS format.

27. The non-transitory computer-readable medium according to claim 26, wherein the enhanced SMS message types further include a financial message type representing a request to deposit funds in a financial account or withdraw funds from the financial account.

28. The non-transitory computer-readable medium according to claim 26, wherein the first enhanced SMS message is the call message type representing a request for accessing a call forward list associated with a telephone located remotely from the device that sends the first enhanced SMS message.

29. The non-transitory computer-readable medium of claim 26, wherein the machine-readable information of the first enhanced SMS message is included in a predetermined location of the first enhanced SMS message.

30. The non-transitory computer-readable medium of claim 29, wherein the predetermined location is a header or footer of the first enhanced SMS message.

* * * * *